C. J. TROPPMAN.
OPHTHALMOMETER.
APPLICATION FILED MAY 22, 1911.
1,046,122.
Patented Dec. 3, 1912.
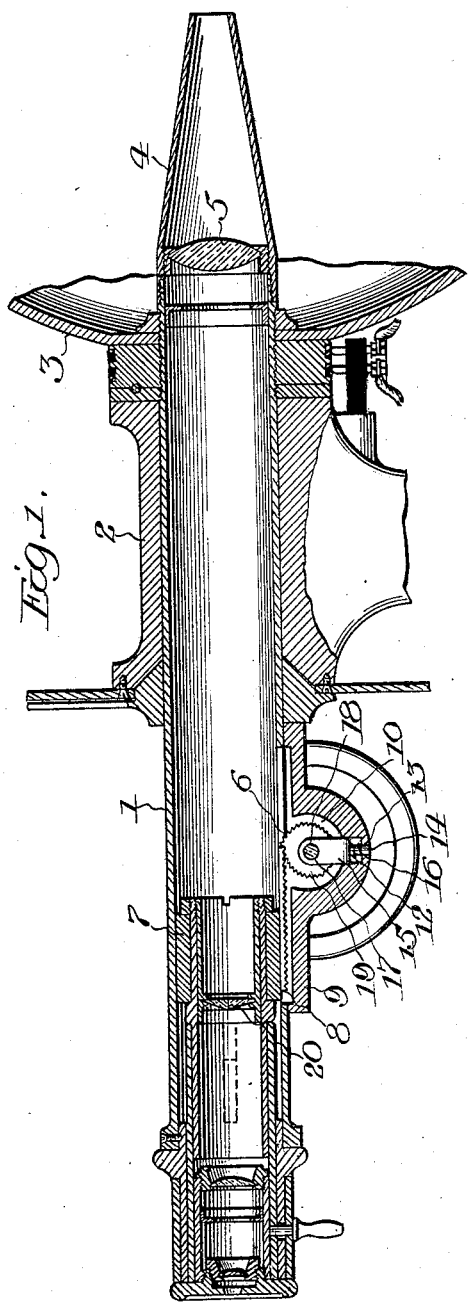
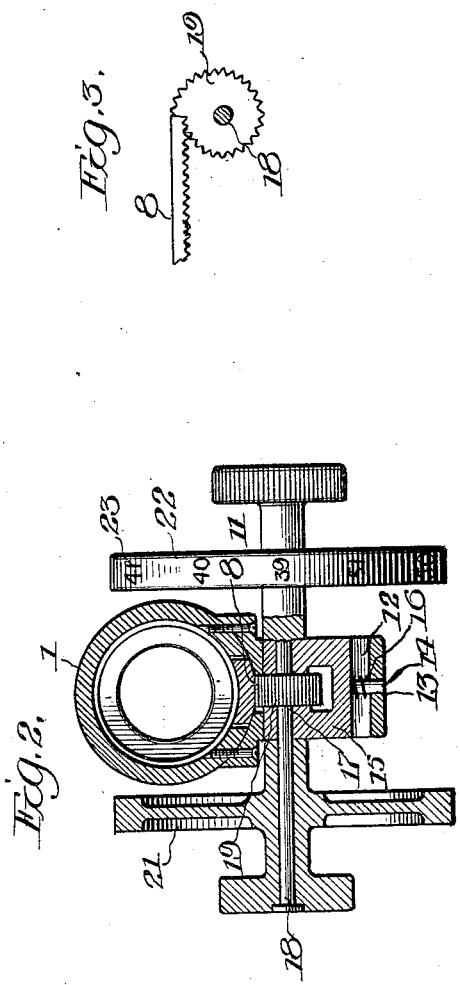
Witnesses
Inventor
Charles J. Troppman
by Benjamin Roorhoure
Attys

UNITED STATES PATENT OFFICE.

CHARLES J. TROPPMAN, OF CHICAGO, ILLINOIS, ASSIGNOR TO F. A. HARDY & COMPANY, A CORPORATION OF ILLINOIS.

OPHTHALMOMETER.

1,046,122. Specification of Letters Patent. Patented Dec. 3, 1912.

Application filed May 22, 1911. Serial No. 628,709.

*To all whom it may concern:*

Be it known that I, CHARLES J. TROPPMAN, a citizen of the United States, residing at Chicago, in the county of Cook and State of Illinois, have invented a new and useful Improvement in Ophthalmometers, of which the following is a specification.

My invention has relation to ophthalmometers in which a telescope is disposed with relation to luminous targets or mires so that the images of the targets or mires will be reflected into the telescope from the corneal surface and refracting means such as a double or birefringent prism is employed to move longitudinally within the telescope so that the images as seen in the telescope may be moved together or separated. The location of the images as reflected from the cornea being dependent upon the curvature of the cornea, the location of the prism within the telescope necessary to secure a certain relation of the images as seen furnishes data from which the curvature can be ascertained. These conditions have already been utilized by disposing scales upon the means for moving the prism, the position of which indicates, either in radii or diopters, that is refractive power, the curvature of the corneal surface which will secure the desired relation of images at that position of prism.

As the movement of the prism is not uniform for uniform changes of curvature or location of images, it has heretofore been necessary to provide specially constructed scales, and my invention consists in providing the ophthalmometer with means which, for a given extent of movement will move the prism a progressively increasing or diminishing amount. Such a provision will permit of the employment of uniform scales which are of advantage from both a manufacturing and operative standpoint.

My invention is illustrated in the accompanying drawing, in which:—

Figure 1 is a central longitudinal section of the telescope of an ophthalmometer with my invention applied thereto; Fig. 2 is a transverse section on line 2—2 of Fig. 1, one scale wheel being shown in elevation; and Fig. 3 is a detail of the rack and eccentric gear.

Similar reference numerals refer to similar parts throughout the several views.

The reference numeral 1 designates the telescopic tube in an ophthalmometer which is rotatably mounted in a bearing, 2, and has provided upon its forward end a member, 3, (a fragment of which is shown in Fig. 1) for holding the mires. The forward end of the telescopic tube, 1, terminates in a nose piece 4, in which is mounted the objective lens or lens system, 5.

In the telescopic tube, 1, to the rear of the bearing, 2, is a longitudinally disposed opening, 6, and mounted to move longitudinally within the telescope tube is a collar, 7, which carries a rack, 8, extending into the opening, 6.

A block, 9, is secured to the outer surface of the tube, 1, so as to cover the opening, 6, and in the block, 9, is a recess, 10, which opens upon each side.

In the bottom of the recess, 10, is a rectangular pocket, 12, and in the bottom of the pocket the block is bored to form a cylindrical guide way 13. Mounted to slide in the guide way is a pin, 14, upon the top of which is a U-shaped yoke, 15, between the bottom of which and the bottom of the pocket 12, and about the pin, 14, is a coiled spring, 16, which yieldingly holds the yoke, 15, in its most upwardly position.

In the tops of the arms of the yoke, 15, are provided bearings, 17, and mounted in the bearings, 17, is an arbor, 18, upon which and between the arms of the yoke is secured the eccentric gear, 19, which is held yieldingly in mesh with the rack, 8, by the spring, 16, so that the gear and rack will not bind.

Suitably mounted within the collar, 7, is the double or birefringent prism, 20, and mounted upon the arbor, 18, are wheels 21 and 22, on which may be disposed scales for showing the radius of the corneal curvature or the refractive value for the particular curvature which for that position of the prism, 20, will secure the desired location of the images in the telescope. In Fig. 2, a scale, 23, is shown upon the periphery of the right hand wheel 22.

It will now be seen that by reason of the ecentric gear, 19, a movement of the periphery of the wheels, 21 and 22, through uniform distances or equal numbers of degrees of arc, will impart, through the arbor, 18 and eccentric gear, 19, an increasing or diminishing extent of movement to the rack, 8, collar, 7, and prism, 20. By means of the selection of a suitable eccentricity of the gear, 19, a scale may be employed of suitable amplitude of divisional marks in which the markings are equal distances from each other.

Having described my invention, what I claim as new and desire to secure by Letters Patent, is:—

1. In an ophthalmometer comprising a telescope, mires disposed with relation thereto so that images thereof will be reflected from the corneal surface of an eye into said telescope, movable refracting means for changing the position of said images as seen through said telescope and means for moving said refracting means which will impart an increasing or decreasing latitude of movement to said refracting means for equal movements of said moving means.

2. In an ophthalmometer, a telescope, mires fixed with relation to the optical axis thereof, a double prism mounted within said telescope, the base whereof is transverse to said optical axis, an arbor, an eccentric connecting said arbor with the mounting of said prism so as to cause said prism to move different distances for movements of said arbor through equal arcs.

3. In an ophthalmometer, a telescope, mires disposed so that images thereof will be reflected from the eye under observation into said telescope, a double prism located transverse to the optical axis of said telescope in the path of the light from said mires, a rack carried by said prism, an eccentric gear meshing with said rack, an arbor extending through said gear, and scales secured to said arbor.

4. In an ophthalmometer, a telescope, mires disposed so that images thereof will be reflected from the eye under observation into said telescope, a double prism located transverse to the optical axis of said telescope in the path of the light from said mires, a rack carried by said prism longitudinally of said optical axis, an eccentric gear meshing with said rack, an arbor extending through said gear, and scales secured to said arbor.

5. In an ophthalmometer, a telescope, mires disposed so that images thereof will be reflected from the eye under observation into said telescope, a double prism located transverse to the optical axis of said telescope in the path of the light from said mires, a rack carried by said prism, an eccentric gear, means for holding said gear yieldingly in mesh with said rack, an arbor extending through said gear, and scales secured to said arbor.

6. In an ophthalmometer comprising a telescope for viewing the eye, mires disposed so that images thereof will be reflected from the eye under observation into said telescope, a movable refractor transverse to the optical axis of said telescope, a uniform scale, and means connecting said scale, and said refractor, whereby movements of said scale through equal extents will impart increasing or diminishing amplitudes of movement to said refractor.

In testimony whereof I have hereunto set my hand in the presence of two witnesses.

CHARLES J. TROPPMAN.

Witnesses:
JOHN H. HARDIN,
BENJ. T. ROODHOUSE.

---

Copies of this patent may be obtained for five cents each, by addressing the "Commissioner of Patents, Washington, D. C."